United States Patent
Shen et al.

(10) Patent No.: US 11,221,594 B2
(45) Date of Patent: Jan. 11, 2022

(54) PRACTICAL METHOD FOR SHORT-TERM OPERATIONS OF SUPER LARGE-SCALE HYDROPOWER PLANTS

(71) Applicant: DALIAN UNIVERSITY OF TECHNOLOGY, Liaoning (CN)

(72) Inventors: Jianjian Shen, Liaoning (CN); Chuntian Cheng, Liaoning (CN); Rui Cao, Liaoning (CN); Qianqian Shen, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 36 days.

(21) Appl. No.: 16/644,431

(22) PCT Filed: Mar. 16, 2018

(86) PCT No.: PCT/CN2018/079307
§ 371 (c)(1),
(2) Date: Mar. 4, 2020

(87) PCT Pub. No.: WO2019/174039
PCT Pub. Date: Sep. 19, 2019

(65) Prior Publication Data
US 2020/0209812 A1    Jul. 2, 2020

(51) Int. Cl.
*G05B 13/04* (2006.01)
*H02J 3/00* (2006.01)
(Continued)

(52) U.S. Cl.
CPC .............. *G05B 13/041* (2013.01); *E02B 9/00* (2013.01); *H02J 3/003* (2020.01); *H02J 3/004* (2020.01); *G06F 17/11* (2013.01); *H02J 2300/20* (2020.01)

(58) Field of Classification Search
None
See application file for complete search history.

(56) References Cited

U.S. PATENT DOCUMENTS 5,148,365 A * 9/1992 Dembo .................. G06Q 10/06
705/36 R
9,811,061 B1 * 11/2017 Hu ........................ G06Q 50/06
(Continued)

FOREIGN PATENT DOCUMENTS

| CN | 102867275 A | 1/2013 |
| CN | 103020742 A | 4/2013 |
| CN | 104182804 A | 12/2014 |

OTHER PUBLICATIONS

Cheng, Chuntian et al., "Short-term Optimal Operation Methods of Large-scale Hydropower Plants General Overview," Journal of Hydraulic Engineering, vol. 42. No. 9. Sep. 30, 2011, ISSN: 0559-9350.

*Primary Examiner* — Nathan L Laughlin
(74) *Attorney, Agent, or Firm* — Muncy, Geissler, Olds & Lowe, P.C.

(57) ABSTRACT

A practical method for short-term operations of large-scale hydropower plants divides all hydropower plants into three categories using operation characteristics such as system hierarchy, space attributes, task requirements, and schedule particularity. A strategy for adjusting spillage based on peak-shaving response and a strategy for equal load reduction in off-peak hours check and adjust power generation of hydropower plants with specified dispatching modes. For medium- and small-sized cascaded hydropower plants, the load distribution among plants is optimized with an objective of minimizing total power release subject to control condition of total generation profile. For large-size cascaded hydropower plants, an optimization model for peak-shaving operations and a method for balancing power plants with (Continued)

equal load rate are combined to respond to system peak demands and guarantee power balance in all periods.

2 Claims, 7 Drawing Sheets

(51) Int. Cl.
*E02B 9/00* (2006.01)
*G06F 17/11* (2006.01)

(56) References Cited

U.S. PATENT DOCUMENTS

2018/0024514 A1    1/2018  Hu
2018/0100480 A1*   4/2018  Duquette ............... G05B 15/02

* cited by examiner

PRACTICAL METHOD FOR SHORT-TERM OPERATIONS OF SUPER LARGE-SCALE HYDROPOWER PLANTS

TECHNICAL FIELD

The present invention relates to the field of hydropower scheduling, in particular to a practical method for short-term operations of super large-scale hydropower plants.

BACKGROUND

The large-scale development of hydropower in China has achieved a qualitative leap forward. A group of giant cascaded hydropower plants with over 10 million kilowatts (kW) have been constructed in some large basins such as Lancang River, Jinsha River, Yalong River and Hongshui River. These hydropower plants are connected through ultra-high voltage (UHV) AC/DC lines. Thus, hydropower-dominated provincial power grids with installed capacity of 80 million kW and regional power grids with installed capacity of 100 million kW have emerged. The difficulties of dispatching such large-scale hydropower systems are greatly different from conventional medium- and small-sized hydropower systems or cascaded hydropower plants. The computational scale of optimal operations for cascaded hydropower plants on large basins is very big, facing prominent dimension disaster problems. Moreover, due to high water head and huge generating units, most hydropower systems face not only conventional operation constraints and conditions such as short-term generation climbing limitation, high-accuracy control of generations at related periods, as well as minimum duration of start-up and shutdown, but also restriction of multi-level nested sections and discrepant requirement of power transmission caused by complex grid structures. Coupling of electric power and hydraulic connection constitutes increasingly refined control conditions, which increases the difficulty of generation scheduling. How to break through obstacles of super large scale, high dimension, and nonlinear space-time coupling of complex hydropower systems, and obtain optimal operation and dispatching schemes of hydropower plants, is the key problem that is urgent to be solved in actual production. The target is to play a guiding role in real-world engineering and meet practical requirements.

Existing literatures about operations of large-scale hydropower plants mainly focus on the objective function and constraints modeling and optimization algorithm, from a mathematical point of view. Some outstanding research results have been reached. Barros and Zambon have modeled the optimal operation of more than 100 hydropower plants in Brazil and constructed linear and non-linear programming models. However, this study mainly focuses on long-term planning. Moreover, many simplifications have been carried out in order to employ commercial software such as MINOS and CPLEX to solve the problems. Both timeliness and accuracy of results are difficult to meet more complex practical needs of short-term operations. Many other published reports studied algorithms of optimal operations of hydropower plants. Some effective dimension reduction methods and strategies based on different ideas have been proposed and analyzed by simulations of some large-scale cascaded hydropower system operations. In general, as a forward-looking basic research, existing researches have enlarged the calculation scale and improved the calculation speed and accuracy, but they still face "dimension disaster" when solving large-scale hydropower system operations. In particular, in the actual production of simple mathematical optimization results are mostly considered as strategy-oriented schemes in real-world operations, lacking practicability. At present, practical researches on generation scheduling with actual production tasks are relatively rare. Therefore, it is of great theoretical and practical value to find a practical method of short-term optimal operations for large-scale hydropower system, which can takes into account operation characteristics of hydropower system and expert experiences in actual operation, and break through the bottleneck of hydropower scheduling technology.

For the above problem, the invention proposes a practical method of short-term operations for super large-scale hydropower plants. Furthermore, a hydropower system with 162 plants in Yunnan Power Grid is taken as an example for verifying the method. The results show that results obtained by the present invention can quickly give reasonable operation results and meanwhile meet timeliness and practical requirements of actual operations of the power grid.

SUMMARY

The invention aims to solve the technical problems including "dimension disaster" of super large-scale hydropower plants and the practicality of results. The method proposed by the invention can classify all hydropower plants according to problem characteristics and natures of hydropower plants to iteratively solve large hydropower system. The "dimension disaster" problem can be significantly alleviated. Meanwhile, requirements of hydropower plants and power grids, as well as actual experiences can be used to effectively simplify the dispatching modes of generation scheduling, reduce the number of optimized hydropower plants, reduce the difficulty of problem modeling and solution, and improve the availability and practicability of the optimization results.

The Technical Solution of the Invention

A practical method for short-term operations of super large-scale hydropower plants includes the following steps:

(1) categorizing hydropower plants based on operation characteristics: according to operation characteristics including hierarchy, natural space attributes, task requirements, time scale and schedule particularity, hydropower plants are classified and grouped, and different modeling methods and solution strategies are selected to make it solvable and quickly obtain calculation results of meeting actual engineering requirements; hydropower plants are divided into three categories: hydropower plants with specified dispatching modes, medium- and small-sized cascaded hydropower plants and large-scale cascaded hydropower plants;

(2) for hydropower plants with specified dispatching modes, since there is little change in system load demand, inflow and control requirements during adjacent days, there is no need to substantially adjust generation schedules of previous day or plan arrangement; this is beneficial to the implementation of generation schedules or operation safety of power grids, power plants and units; thus, dispatching modes of power plants can be determined, including fixed generation and fixed water level; thus, the number of power plants to be optimized can be reduced; in this case, only day-ahead generation schedules need to be checked; a little adjustment is needed when spillage and other special requirements cannot be satisfied; specific adjusting method involves two typical situations in the following.

(a) when spillage occurs since the reservoir water level is higher than the upper limit, a strategy for adjusting spillage based on peak-shaving response is used; selecting multiple continuous periods with the largest loads from all periods before last spillage period and denoting them as $[t_1, t_2]$; Eq. (1) is adopted to increase generation schedule of power plant to avoid or reduce spillage; an iterative adjustment is carried out until generation, power discharge, and reservoir water level reach their upper boundaries in all periods.

$$p'_{i,t} = \min(p_{i,t} + p_d, \overline{p}_{i,t}) \tag{1}$$

$$p_d = \min\left\{\frac{El_i}{(t_2 - t_1 + 1)\Delta t}, \min_{t=t_1}^{t_2}(p_{i,t} + pr_i)\right\} \tag{2}$$

where $p_d$ is step of generation adjustment; $pr_i$ is allowable maximum change of generation increase or decrease of power plant i at adjacent periods; $p_{i,t}'$ is generation of power plant i at period t; $p_{i,t}$, $\overline{p}_{i,t}$ are average generation and upper limit of power plant i at period t, respectively; $El_i$ is spilled electricity; $\Delta t$ is hours during period t; t and T are period index and total number, respectively; $[t_1, t_2]$ is a set of $T_i^{min}$ continuous periods with the largest load value; $T_i^{min}$ is minimum duration of generation extremum;

(b) when water level is below lower limit and reservoir is unable to meet specified dispatching mode or generation, a strategy for equal load reduction in off-peak hours is proposed; $T_i^{min}$ continuous periods with minimum load value are selected and denoted as $[t_3, t_4]$; Eq. (3) is adopted to reduce generation of power plant to ensure feasibility of power generation; an iterative adjustment is carried out until power generations in all period reached specified lower bound;

$$p_{i,t}' = \max\{p_{i,t} - p_d^0, \underline{p}_{i,t}\}, t_3 \le t \le t_4 \tag{3}$$

where $\underline{p}_{i,t}$ is lower limit of generation of power station i at period t; $p_d^0$ is given step of generation adjustment; $[t_3, t_4]$ is a set of $T_i^{min}$ continuous periods with the largest load value;

(3) for medium- and small-sized cascaded hydropower plants, load distribution among plants is optimized with an objective of minimizing total power release subject to the control condition of total generation profile; such a model is solved by a mutative-scale method (Shen Jianjian, Cheng Chuntian, Li Weidong, et al. *A Mutative-scale optimization method for short-term operation of hydropower plants with complex temporal coupling constraints*. Proceedings of the CSEE, 2014, 34(1):87-95); during this solution process, emphasis is placed on a load balance constraint in Eq. (4); an external penalty function method is used to deal with it, where an objective penalty item is introduced; which is represented as Eqs. (5) and (6);

$$\sum_{i=1}^{N} p_{i,t} = p_t \tag{4}$$

$$F_{pen} = \sum_{t=1}^{T} r_t \times \left|\sum_{i=1}^{N} p_{i,t} - p_t\right| \tag{5}$$

$$r_t = \begin{cases} 0, \text{ if } \left|\sum_{i=1}^{N} p_{i,t} - p_t\right| \le \varepsilon \\ a \times \left|\sum_{i=1}^{N} p_{i,t} - p_t\right|^2, \text{ else} \end{cases} \tag{6}$$

where $p_t$ is total generation for a given period t; N is total number of hydropower plants; $F_{pen}$ an objective penalty function; $r_t$ is a penalty coefficient; $\varepsilon$ is an allowable maximum error of load balance; a is a penalty constant;

(4) for large-size cascaded hydropower plants, an optimization model for peak-shaving operations and a method for balancing power plants with equal load rate are proposed and combined to respond to system peak demands and guarantee power balance in all periods;

step 1: optimizing generation of non-balancing power plants; Eq. (7) is used to construct an optimization model of peak-shaving operations; the mutative-scale method is used to solve the model;

$$\begin{cases} \min F_1 = \sum_{t}^{T} (R_t - \overline{R})^2 \\ R_t = L_t - \sum_{i=1}^{N} p_{i,t} \\ \overline{R} = \frac{1}{T}\sum_{t=1}^{T} R_t \end{cases} \tag{7}$$

where min $F_1$ is minimum distributed load of power plant; $R_t$ is residual load of power grid at period t after a hydropower plant regulates peak loads; $\overline{R}$ is an average residual load of power grid; $L_t$ is load demand of power grid in period t;

step 2: optimizing generation of balanced power plants; dividing remaining electricity $\tilde{E}_{t_c}$ of each power plant into Y parts equally and express it as $\{\tilde{E}_{i_c}^1, \tilde{E}_{i_c}^2, \ldots, \tilde{E}_{i_c}^Y\}$, $\tilde{E}_{i_c} = \tilde{E}_{i_c}^1 + \tilde{E}_{i_c}^2 + \ldots + \tilde{E}_{i_c}^Y$; setting initial electricity of each power plant as $\tilde{E}_{i_c}^1$, c=1, 2, ..., C, C is total number of balanced power plants; according to order from upstream to downstream, a successive load shedding method is used to determine generation profile of power plants; repeating step 2, updating distributed electricity of each power plant with next electricity block, and determining corresponding generation profile; this process is stopped until calculation of all electricity blocks is completed; a final generation of each power plant is obtained by accumulating generations of all electricity blocks.

The invention can achieve significant effects. The present invention divides hydropower plants into several categories to solve them with a dimension reduction way according to operation characteristics including hierarchy, natural space attributes, task requirements, time scale and schedule particularity. A strategy for adjusting spillage based on peak-shaving response and a strategy for equal load reduction in off-peak hours are proposed to check and adjust power generation of hydropower plants with specified dispatching modes. For medium- and small-sized cascaded hydropower plants, the load distribution among plants is optimized with an objective of minimizing total power release subject to control condition of total generation profile. For large-size cascaded hydropower plants, an optimization model for peak-shaving operations and a method for balancing power plants with equal load rate are proposed and combined to respond to system peak demands and guarantee power balance in all periods. Compared to conventional method of dimension reduction based on mathematical algorithms or optimization algorithms, the invention can quickly obtain generation schedules of cascaded hydropower plants, meeting timeliness and practical requirements. It provides a novel technical way for efficiently solving generation scheduling of super large-scale hydropower system in southern regions of China.

DETAILED DESCRIPTION

The specific embodiments of the present invention are further described below in conjunction with the drawings and technical solutions.

For the operation problems of super large-scale hydropower system with more than 100 plants, in order to achieve an effective dimension reduction, the fundamental way is to reduce the number of hydropower plants involved in the calculation and the number of decision variables and states during the optimization iteration process. The corresponding reduction rules can be summarized according to characteristics of engineering problems. Specifically, according to operation characteristics including hierarchy, natural space attributes, task requirements, time scale and schedule particularity, hydropower plants are classified and grouped, and different modeling methods and solution strategies are selected to make it solvable and quickly obtain calculation results of meeting actual engineering requirements.

(1) Dimension Reduction Based on Operation Characteristics of Large-Scale Hydropower Systems According to the idea of dimension reduction based on operation characteristics of hydropower systems mentioned above, with the background of large-scale provincial hydropower systems, a method of short-term operations for large-scale hydropower plants in hydro-dominated power grid is proposed. This method aims to solve generation scheduling problems with considering the principles of efficiency, feasibility and practicability. According to operation characteristics, the hydropower plants dispatched by power grids are classified into different groups to solve iteratively. Thus, the scale of optimization calculation can be reduced.

The first category is hydropower plants with specified dispatching modes. In actual generation scheduling, if there is little change in system load demand, inflow and control requirements during adjacent days, then there is no need to substantially adjust generation schedules of previous day or plan arrangement. This is beneficial to the implementation of generation schedules or operation safety of power grids, power plants and units. Thus, dispatching modes of power plants can be determined, including fixed generation and fixed water level. The number of power plants to be optimized can be reduced. In this case, only day-ahead generation schedules need to be checked; a little adjustment is needed when spillage and other special requirements cannot be satisfied.

The second category is medium- and small-sized cascaded hydropower plants. Usually, a hydropower-dominated power grid includes many medium- and small-sized cascaded hydropower plants, which is characterized as big plant number and small scale. Their power generations have relatively little impact on the power grid. Therefore, when making generation schedules for such power plants, the power grid often regards them as a whole, i.e., a virtual power plant. The total generation profile of the virtual power plant is given, and optimal load distribution among cascaded hydropower plants is separately carried out to further reduce the calculation scale.

The third category is large-sized cascaded hydropower plants. Such category of hydropower plants has good regulation ability and large installed capacity. The power grid can determine daily generation electricity or water level control conditions of each power plant in advance according to medium- and long-term dispatching control requirements. The system load and peak-shaving requirements are also taken into account to develop an optimization model and solve it. When the plant number is still large, an iteration optimization for different groups of hydropower plants can be used to reduce the plant number at each iteration.

(2) Solution Method for Hydropower Systems with Specified Dispatching Modes.

The first category is hydropower plants with specified dispatching modes. For example, the power generation profile is fixed or specified dispatching order is used to schedule power plants. This kind of hydropower plants mainly needs hydrological verification and analysis. According to violation of water level limitations, spillage and water shortage, appropriate strategies are adopted to modify initial dispatching modes or generation schedules to ensure the feasibility of the results. Therefore, two typical violations situations are considered. When spillage occurs since reservoir level is higher than the upper limitation, a strategy for adjusting spillage based on peak-shaving response is proposed. This strategy aims to properly increase generation production to avoid or reduce spillage. When reservoir water level is below the lower limitation and thus the given dispatching modes or generation schedules are not satisfied due to water shortage, a strategy for equal load reduction in off-peak hours is proposed to reduce the planned generation production appropriately and ensure the feasibility of power generations.

(2.1) A Strategy for Adjusting Spillage Based on Peak-Shaving Response

For any power plant i, the spillage is checked period by period. If there is $Ql_{i,t}>0$, at any a period, the spillage adjustment is needed. Based on the heuristic information of responding to peak loads of power grid, an iterative strategy for adjusting spillage is proposed. The specific steps are as follows:

Step 1: Determine the period t' in which spillage occurs. Check each period to determine whether there is spillage for power plant m. If there is $Ql_{i,t} \leq 0, 1 \leq t \leq T$, then spillage adjustment ends; otherwise, the last spillage period is marked as t'.

Step 2: Denote the set of time periods in [0, t'] as $\Psi$, and remove invalid periods (That is, the generation or spillage of power plant, and reservoir water level reaches the upper boundary.) in [0, t'] from $\Psi$. Judge whether the set $\Psi$ is empty, If so, the spillage adjustment ends; otherwise, go to the next step.

Step 3: Estimate spilled electricity. The total spilled electricity of power plant i is calculated by the following equation.

$$El_i = \sum_{t=1}^{T} \frac{Ql_{i,t}}{r_{i,t}} \times 3.6 \times \Delta t \qquad (8)$$

where $Ql_{i,t}$ is spilled discharge of power plant i at period t; $r_{i,t}$ energy generated at plant i per unit of water release through the turbines in period t.

Step 4: Denote peak load periods as $[t_1, t_2]$. According to the requirement for minimum duration $T_i^{min}$ of power generation extreme value, $T_i^{min}$ continuous periods with maximum load value are selected from the period set $\Psi$, which is recorded as $[t_1, t_2]$.

Step 5: Determine the step of generation adjustment. Eq. (9) is used to determine the step of generation adjustment.

$$p_d = \min\left\{ \frac{El_i}{(t_2 - t_1 + 1)\Delta t}, \min_{t=t_1}^{t_2}(p_{i,t} + pr_i) \right\} \qquad (9)$$

Step 6: Adjust power generation. Eq. (10) is used to modify the power generation at periods $t_1 \sim t_2$. Meanwhile, the following method is utilized to implement the calculation of the fixed generation from $t_1$ to T. The corresponding power discharge and reservoir water level are determined and return to Step 1.

$$p_{i,t}' = \min(p_{i,t} + p_d, \overline{p}_{i,t}) \qquad (10)$$

The calculation method of fixed generation: for any a period t, the power generation is taken as control objective; the maximum and minimum power discharge are taken as the boundary conditions; a dichotomy method is used to search iteratively until difference between the calculated generation and the given value satisfies the convergence accuracy; Eq. (11) is used to determine the generation in the search process.

$$p_{i,t} = f_i(Z_{i,t-1}, Q_{i,t}, q_{i,t}, Ql_{i,t}, \Delta t) \qquad (11)$$

where $f_i(\cdot)$ is relationship among generation, water head and power discharge of hydropower plant i; $Z_{i,t-1}$ is reservoir water level of hydropower plant i at period t; $Q_{i,t}$ is inflow of hydropower plant i at period t; $q_{i,t}$ is power discharge of hydropower plant i at period t.

(2.2) A Strategy for Equal Load Reduction in Off-Peak Hours

When reservoir water level reaches the lower limitation and meanwhile the given dispatching mode is not met, it is necessary to reduce the generation of power plant appropriately to ensure the feasibility of generation schedules. Therefore, a strategy for equal load reduction in off-peak hours is proposed. The generation in off-peak periods is first adjusted to realize deep load regulation by utilizing regulation ability of hydropower plants as far as possible. Specific adjustment strategies are as follows:

Step 1: Implement the calculation of fixed generations; check all periods and judge whether the given generation is satisfied; if so, the adjustment is completed; otherwise, the last period at which the given generation is not satisfied is denoted as t".

Step 2: Mark period set in the interval [0, t"] as $\Gamma$, and remove invalid periods at which power generation reaches the lower limitation from the set. If the set is empty at this time, the calculation ends; otherwise, go to Step 3.

Step 3: According to the requirement of minimum duration $T_i^{min}$ of power generation extreme value, $T_i^{min}$ continuous periods with minimum load value are selected from the set $\Gamma$, which is recorded as $[t_3, t_4]$.

Step 4: Adjust power generation at each period using Eq. (12) and return to Step 1.

$$p_{i,t}' = \max\{p_{i,t} - p_d^0, \underline{p}_{i,t}\}, t_3 \leq t \leq t_4 \qquad (12)$$

where $\underline{p}_{i,t}$ is the lower limitation of power generation of power station i at period t; $p_d^0$ is the given step of generation adjustment.

(3) Solution Method for Medium- and Small-Sized Cascaded Hydropower Plants

As aforementioned, medium- and small-sized cascaded hydropower plants in the second type usually have predetermined overall planned generation profiles, which requires optimal load distribution among cascaded hydropower plants. For this reason, an optimization model is developed with the objective of minimizing total power discharge and constraints of hydropower operations. Moreover, an appropriate solution strategy is adopted to efficiently solve the total generation constraint of cascaded hydropower plants at every period.

(3.1) Objective of Minimizing Total Power Discharge of Cascaded Hydropower Plants With the given total generation of cascaded hydropower plants, in order to save water resources and improve the ending energy storage of cascaded hydropower plants, an objective function of load distribution for cascaded hydropower plants is established with minimizing total power discharge as the optimization criterion. It is represented as follows $$F_1 = \min \sum_{t=1}^{T} \sum_{i=1}^{N} q_{i,t} \times \Delta t \qquad (13)$$

where N is total number of hydropower plants.

(3.2) Constraints

1) Load balance constraints $$\sum_{i=1}^{N} p_{i,t} = p_t \qquad (14)$$

where $p_t$ is the given total generation at period t.

2) Water balance constraints $$Q_{i,t} = R_{i,t} + \sum_{k=1}^{K} QT_{i,t}^{k} \quad (15)$$

$$V_{i,t+1} = V_{i,t} + 3600 \times (Q_{i,t} - q_{i,t} - S_{i,t})\Delta t \quad (16)$$

where $R_{i,t}$ is interval inflow of hydropower plant i at period t; $QT_{i,t}^{k}$ is inflow of hydropower plant k into hydropower plant i at period t after considering water time delay, which is the sum of power discharge and spilled discharge; $V_{i,t}$ is reservoir storage of hydropower plant i at period t; $S_{i,t}$ is spilled discharge of hydropower plant i at period t.

3) Power discharge constraints $$\underline{q_{i,t}} \leq q_{i,t} \leq \overline{q_{i,t}} \quad (17)$$

where $\underline{q_{i,t}}, \overline{q_{i,t}}$ are lower and upper limitations of power discharge of hydropower plant i at period t, respectively.

4) Power generation constraints $$\underline{p_{i,t}} \leq p_{i,t} \leq \overline{p_{i,t}} \quad (18)$$

5) Forebay level constraints $$\underline{Z_{i,t}} \leq Z_{i,t} \leq \overline{Z_{i,t}} \quad (19)$$

where $Z_{i,t}, \underline{Z_{i,t}}, \overline{Z_{i,t}}$ are forebay level, and its lower and upper limitations of hydropower plant i at period t, respectively.

6) Generation climbing capability: It is suitable for non-balanced hydropower plants (without installed automatic generation control units) to limit the increase or decrease range of power generation between adjacent periods, which is formulated as follows:

$$\begin{cases} p_{i,t} - p_{i,t-1} \leq pr_i, & p_{i,t} \geq p_{i,t-1} \\ p_{i,t-1} - p_{i,t} \leq pr_i, & \text{else} \end{cases} \quad (20)$$

7) Safety operation constraints of units: avoiding cavitation and vibration zones under certain generation or water head of hydropower units to ensure safe production of hydropower plants.

$$(p_{i,t} - \overline{ps}_{i,t,k})(p_{i,t} - \underline{ps}_{i,t,k}) \quad (21)$$

where $\overline{ps}_{i,t,k}, \underline{ps}_{i,t,k}$ are upper and lower limitations of the kth restricted operation zones of hydropower plant i at period t, respectively.

8) Startup and shutdown time constraints of units $$\begin{cases} \sum_{\alpha=1}^{T_{i,k}^{down}} (1 - u_{i,k,t-\alpha}) \geq T_{i,k}^{down}(1 - u_{i,k,t-1}) \cdot u_{i,k,t}, & u_{i,k,t} = 1 \\ \sum_{\alpha=1}^{T_{i,k}^{up}} u_{i,k,t-\alpha} \geq T_{i,k}^{up}(1 - u_{i,k,t}) \cdot u_{i,k,t-1}, & u_{i,k,t} = 0 \end{cases} \quad (22)$$

where $T_{i,k}^{up}, T_{i,k}^{down}$ are minimum allowable startup and shutdown time for unit k of hydropower plant i, respectively; $u_{i,k,t}$ is operation status of unit k at period t, which denotes startup as 1, and shutdown as 0.

9) Transmission section limitation $$\sum_{i \in \Omega} p_{i,t} \leq \overline{P_{\Omega}} \quad (23)$$

where $\Omega$ is a set of hydropower plants included in a transmission section; $\overline{P_{\Omega}}$ is upper limitation of transmitting capacity of section $\Omega$.

(3.3) Solution Method

There are a lot of related studies on optimal operations of cascaded hydropower plants, and many feasible solution methods have been proposed. In this section, mutative-scale method proposed by our previous research works is used as the main optimization algorithm. On this basis, an external point penalty function method is used to treat load balance constraints in Eq. (14), and the objective function is reconstructed. The optimal load distribution scheme of cascaded hydropower plants is obtained by an iterative optimization.

For the load balance constraints, a penalty function is constructed as follows:

$$F_{pen} = \sum_{t=1}^{T} r_t \times \left| \sum_{i=1}^{N} p_{i,t} - p_t \right| \quad (24)$$

$$r_t = \begin{cases} 0, & \text{if } \left| \sum_{i=1}^{N} p_{i,t} - p_i \right| \leq \varepsilon \\ a \times \left| \sum_{i=1}^{N} p_{i,t} - p_i \right|^2, & \text{else} \end{cases} \quad (25)$$

where $r_t$ is a penalty coefficient; $\varepsilon$ is allowable maximum deviation of load balance; a is a penalty constant.

In order to ensure an initial solution satisfying the load balance constraints of cascaded hydropower plants and respond to the target demand of minimizing power discharge as far as possible, an iterative search strategy by ordering water consumption rate is proposed to determine an efficient initial feasible solution. The specific steps are as follows:

(1) For each hydropower plant from upstream to downstream, with the initial water level, a calculation with fixed water level is carried out to determine total generation $p_t'$ at each period;

(2) Initialize t=1;

(3) If $p_t' - p_t > \varepsilon$, cascaded hydropower plants are sorted in descending order of water consumption rate, and then go to step (4); if $p_t - p_t' > \varepsilon$, cascaded hydropower plants are sorted in ascending order of water consumption rate, and then go to step (4); if $|p_t' - p_t| \leq \varepsilon$, go to step (5);

(4) With a certain step size, Eq. (26) is used to adjust generation of the first hydropower plant at period t; judge whether there is difference between generation before and after adjustment for the current hydropower plant; if so, recalculate and return to step (3); otherwise, the similar way is used to implement the second hydropower plant, and so on.

$$p_{i,t} = \begin{cases} p_{i,t} - p_d & \text{if } p_t' > p_t \\ p_{i,t} + p_d & \text{else} \end{cases} \quad (26)$$

where $p_d$ is step length of generation adjustment, which is determined by considering upper limit of generation climbing in adjacent periods.

(5) Let t=t+1, if t≤T, return to step (3); otherwise, obtain the initial solution and finish the calculation.

Based on the initial feasible solution, the optimal load allocation scheme is obtained by an iteration optimization using the aforementioned mutative-scale method. The specific steps refer to the previous literature.

(4) Solution Method for Large-Scale Cascaded Hydropower Plants

Large-scale cascaded hydropower plants are usually very important regulating power sources in power grids. They are generally responsible for peak shaving and load balancing of the power grids, and are very important for power system operations, especially for short-term operations. For this kind of hydropower plants, a peak shaving operation model is constructed with the actual demand of power grid in order to optimize day-ahead generation schedules of hydropower plants. Moreover, a load distribution method based on equal load rate is proposed for a few balancing hydropower plants under the control condition of electricity demands, realizing load balance of power grids in each period.

(4.1) Peak-Shaving Optimization Model of Hydropower Plants and Solution Method

For hydropower plants with good regulation performance, the peak-shaving capacity, fast start-stop and climbing capability should be fully utilized to follow system load changes as far as possible, so as to make the residual load profile of power grid after hydropower regulation smooth as far as possible. Thus, the start-stop times and frequent fluctuations of generation of thermal power units with poor regulation performance can be reduced, and the overall operation efficiency of hydropower plants is improved. The stable and efficient operation of the power grid is guaranteed. Therefore, an optimization objective is formulated by minimizing the variance of residual load of power grid:

$$\begin{cases} \min F_1 = \sum_{t}^{T} (R_t - \overline{R})^2 \\ R_t = L_t - \sum_{i=1}^{N} p_{i,t} \\ \overline{R} = \frac{1}{T} \sum_{t=1}^{T} R_t \end{cases} \quad (27)$$

where $R_t$ is residual load of power grid at period t after peak load regulation of hydropower plants; $\overline{R}$ is average residual load of power grid; $L_t$ is load demand of power grid at period t.

The above peak-shaving model also needs to consider various constraints of short-term operation of hydropower plants. The detailed description can refer to the above constraints of medium- and small-sized cascaded hydropower plants, which will not be repeated here. When solving the model, it is necessary to determine the minimum technical generation of hydropower plants according to the startup status of balancing hydropower plants. It is deducted from the current load to obtain residual load $\{R_1, R_2, \ldots, R_T\}$, which is taken as a peak-shaving requirement condition to optimize generation schedules of hydropower plants using the aforementioned mutative-scale method.

(4.2) Method for Balancing Hydropower Plants with Equal Load Rate

Since the above-mentioned optimal operation of hydropower plants needs to consider complex constraints, especially coupling constraints such as generation climbing limitation, minimum duration of startup and shutdown, and generation fluctuation control, the optimization results is difficult to directly realize balance between power supply and demand in all periods. The obtained residual load profile is usually "burr". Load fluctuation is very frequent in adjacent periods. In actual operations, a commonly used method is to select power plants with AGC units as balancing power plant to balance the residual load demand.

For balancing hydropower plants, with installed AGC units, generation scheduling can automatically regulate power output according to AGC instructions. Therefore, complex constraints such as generation fluctuation control and climbing limitation need not be considered in the calculation. In actual power dispatching, daily energy production of each balancing power station is estimated according to the current load profile, which is used as a control condition to optimize reasonable 96-point generation schedules. From the view of fairness of regulating task, the optimization principle of equal generation load rate is adopted for balancing power plants. The invention takes it as a control objective and combines with the load shedding to propose a method for balancing power plants with equal load rate.

The method first needs to consider the unbalanced electricity of power grid and available capacity of balancing power plants. Eq. (28) is used to estimate the target generation production of each power plant.

$$E_{i_c} = \frac{p_{i_c,max}}{\sum_{c=1}^{C} p_{i_c,max}} \times \sum_{t=1}^{T} R_t \times \Delta t \quad (28)$$

where C is number of balancing power plants; $p_{i_c,max}$ is maximum available capacity of power plant $i_c$.

Before optimization, the minimum technical generation of balancing power plants should be deducted from the current load to meet the startup generation requirement of power plants. At the same time, remaining electricity of each power plant can be obtained $$\tilde{E}_{i_c} = E_{i_c} - \sum_{t=1}^{T} p_{i_c,t}^{min} \times \Delta t \quad (29)$$

where $p_{i_c,t}^{min}$ is minimum technical generation of power plant $i_c$ at period t.

To realize equal generation load rate among plants, a load shedding strategy based on electricity blocks. The specific idea is to divide remaining electricity $\tilde{E}$ of each power plant into Y parts equally and express it as $\{\tilde{E}_{i_c}^1, \tilde{E}_{i_c}^2, \ldots, \tilde{E}_{i_c}^Y\}$ $\tilde{E}_{i_c} = \tilde{E}_{i_c}^1 + \tilde{E}_{i_c}^2 + \ldots + \tilde{E}_{i_c}^Y$; set initial electricity of each power plant as $\tilde{E}_{i_c}^1$, c=1, 2, ..., C, C is total number of balanced power plants; according to order from upstream to downstream, a successive load shedding method is used to determine generation profile of power plants; repeat the previous steps, update distributed electricity of each power plant with next electricity block, and determine corresponding generation profile; this process is stopped until calculation of all electricity blocks is completed; a final generation of each power plant is obtained by accumulating generations of all electricity blocks. When solving problems with aforementioned frame, two points should be concerned.

1) After updating with next blocked electricity, a remaining available capacity is calculated according to minimum technical generation of each power plant and accumulated generations; it is taken as an upper generation limit, shown in Eq. (30);

$$p_{i_c,t}^{max} = p_{i_c,max} - p_{i_c,t}^{min} - \sum_{y=1}^{Y'} p_{i_c,t}^y \qquad (30)$$

where $p_{i,t}^{max}$ is remaining maximum available capacity of power plant $i_c$ at period t; Y' is number of electricity blocks that has been calculated; $p_{i_c,t}^y$ is generation of yth electricity block of power plant $i_c$ at period t;

2) After all electricity blocks are calculated, calculation process will stop if power balance in all periods is reached; otherwise, electricity deviation is obtained. Eq. (31) is used to determine number of electricity blocks Y' that need to be recalculated. Meanwhile, all power plants are sorted in ascending order of generation load rate. A load shedding method is used to determine generation profile of the ordered power plants one by one; aforementioned steps are repeated until power balance is attained. It need be mentioned that the forebay level, power discharge, and spilled discharge of each hydropower plant are calculated by the method with fixed generations at every iteration. It is ensured that generation schedules satisfy various operation constraints and condition.

$$\tilde{E}_{i_c}^{Y'+1} + \ldots + \tilde{E}_{i_c}^{Y'} \leq \sum_{t=1}^{T} R'_t \times \Delta t \tilde{E}_{i_c}^{Y''} + \ldots + \tilde{E}_{i_c}^{Y} \qquad (31)$$

Taking day-ahead generation scheduling of hydropower system of Yunnan Power Grid as an example, the method in this invention is verified. Yunnan Power Grid is one of two provincial power grids with the largest hydropower capacity in China. By the end of 2017, there were 162 hydropower plants with installed capacity of more than 60 million kW, accounting for more than 70% of the total installed capacity. Besides meeting the basic power supply requirements, the hydropower system also needs to undertake complex tasks such as peak-shaving, frequency modulation, power transmission from west to east, etc. It faces very prominent optimal operation problems, especially efficient solution of such a large-scale system, which is directly related to the efficiency and practicability of day-ahead generation scheduling of power grid. It is difficult to meet actual requirements by relying on only the mathematical optimization methods. It is necessary to integrate characteristics of actual engineering and dispatching requirements into modeling and solution to improve efficiency and availability of optimal results.

Actual data on one day in 2017 are used to simulate and make generation schedules. According to the idea of the method in this invention, it is necessary to classify and group all hydropower plants dispatched by provincial dispatching center in Yunnan Power Grid. There are 79 hydropower plants in the first category. Their day-ahead generation schedules or dispatching modes of each hydropower plant are predefined according to actual demands. The emphasis is placed on the hydrological verification and analysis of some hydropower plants with complete data. The generation schedules are adjusted with the verification results. The second category consists of 20 virtual hydropower plants, including 61 actual hydropower plants, as shown in Table 1. The generation profiles of hydropower plants are generally determined by the coordination of power grid and river cascaded dispatching corporations, and the load distribution among cascaded hydropower plants is made by the solution method of the second category of hydropower plants. However, some cascaded hydropower plants lack basic information needed for calculation. Therefore, cascaded hydropower plants of Yili River, Supa River and Xier River are mainly calculated and studied in this case. There are 22 hydropower plants in the third category, which are mainly distributed in the downstream reaches of Lancang River, middle reaches of Jinsha River, as well as large watersheds such as Lixian River and Daying River, or key basins concerned. Among them, Manwan and Dachaoshan hydropower plants are installed with AGC units, which are used as balancing power plants to balance the fluctuation of system load. In addition, it is necessary to illustrate that generation schedules of 11 coal-fired power plants in Yunnan Power Grid have been predetermined, and new energy sources such as photovoltaic and wind power are fully absorbed. Therefore, the load demand facing hydropower system is equivalent load after deducting the generation of other power sources. The results of hydropower operations should not only meet peak-shaving requirements of power grid, but also meet power balance constraints at 96 periods throughout the day.

Figure 1:
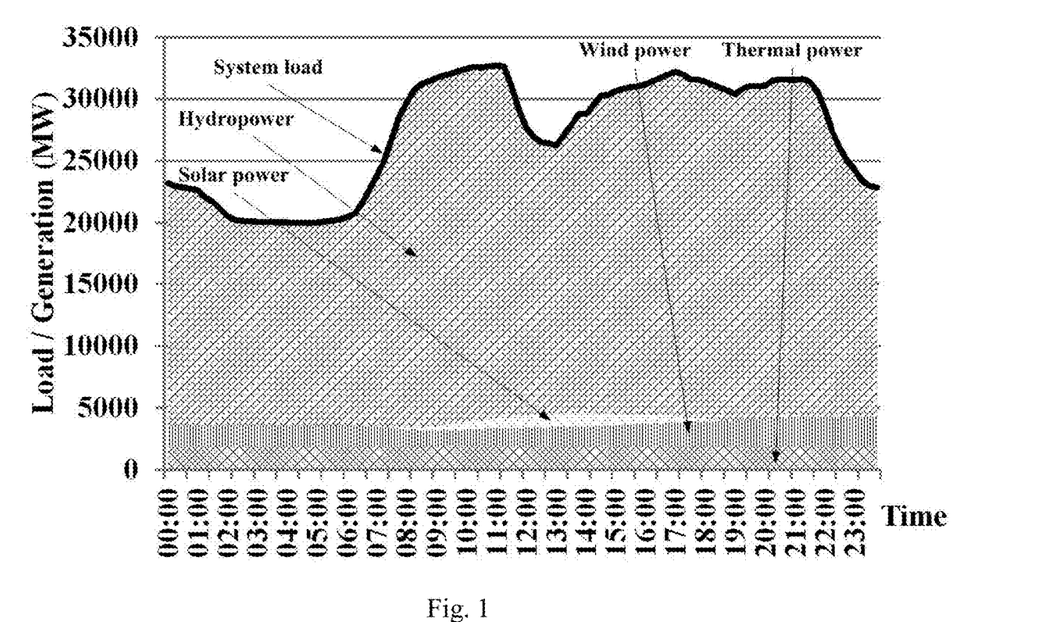
FIG. 1 is a schematic diagram of overall power balance results of a power grid.
Figure 2A:
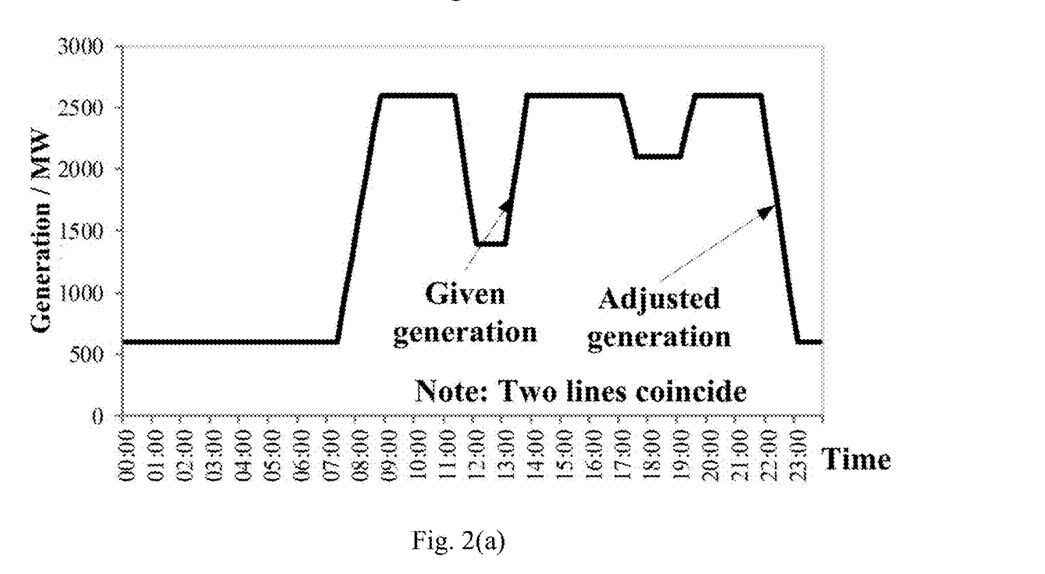
FIG. 2(a) is a schematic diagram of generation results of hydropower plant with fixed dispatching mode—Nuozhadu.
Figure 2B:
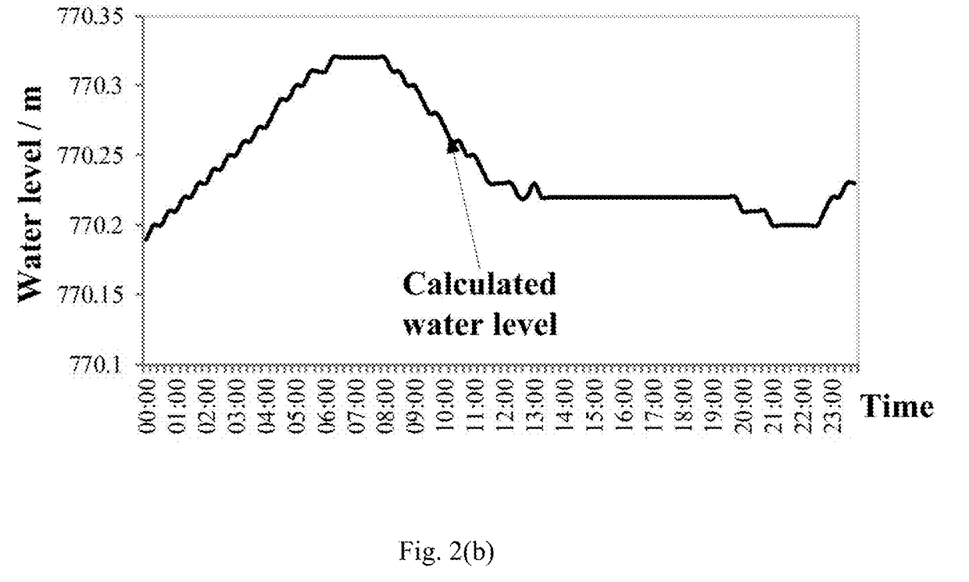
FIG. 2(b) is a schematic diagram of forebay level results of hydropower plant with fixed dispatching mode—Nuozhadu.
Figure 2C:
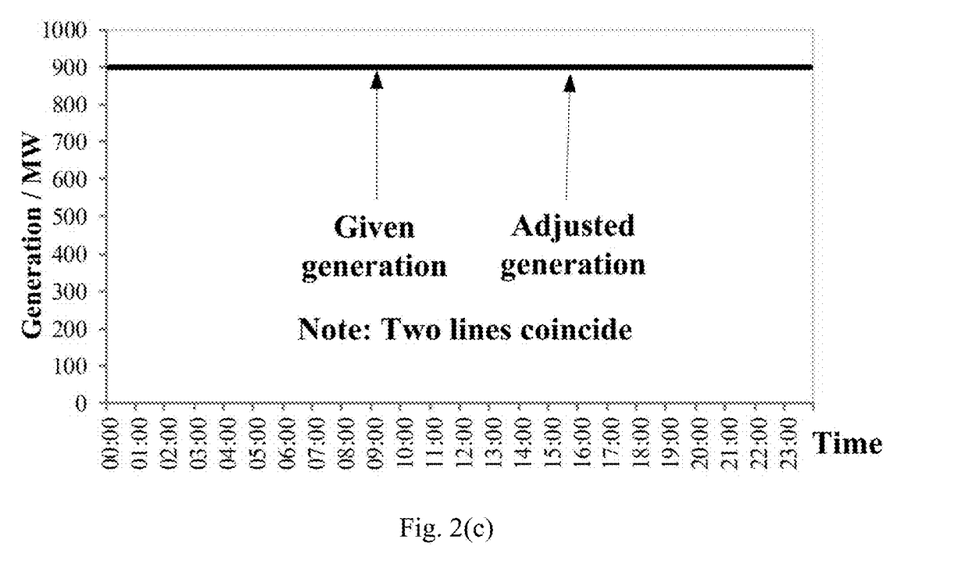
FIG. 2(c) is a schematic diagram of generation results of hydropower plant with fixed dispatching mode—Liyuan.
Figure 2D:
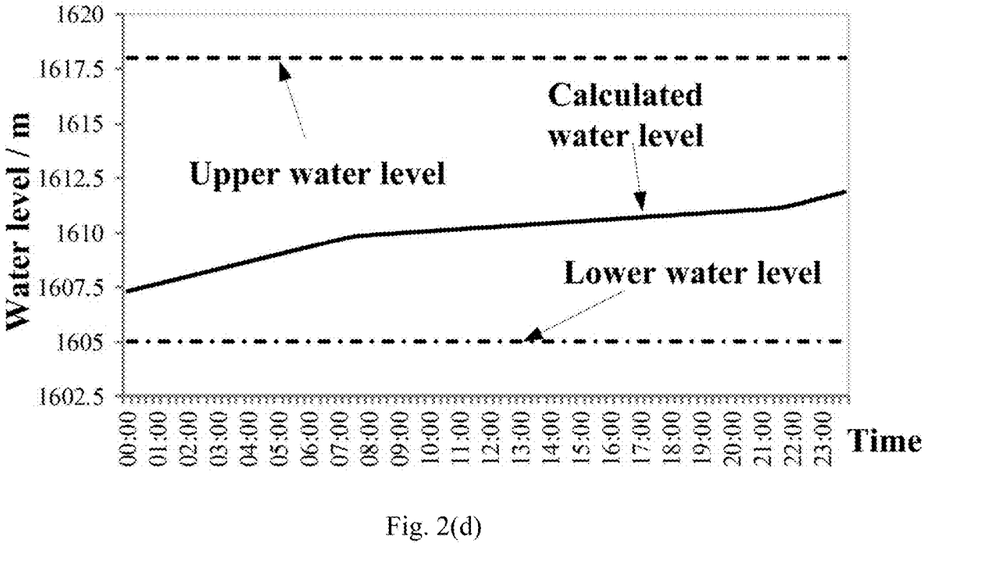
FIG. 2(d) is a schematic diagram of forebay level results of hydropower plant with fixed dispatching mode—Liyuan.
Figure 2E:
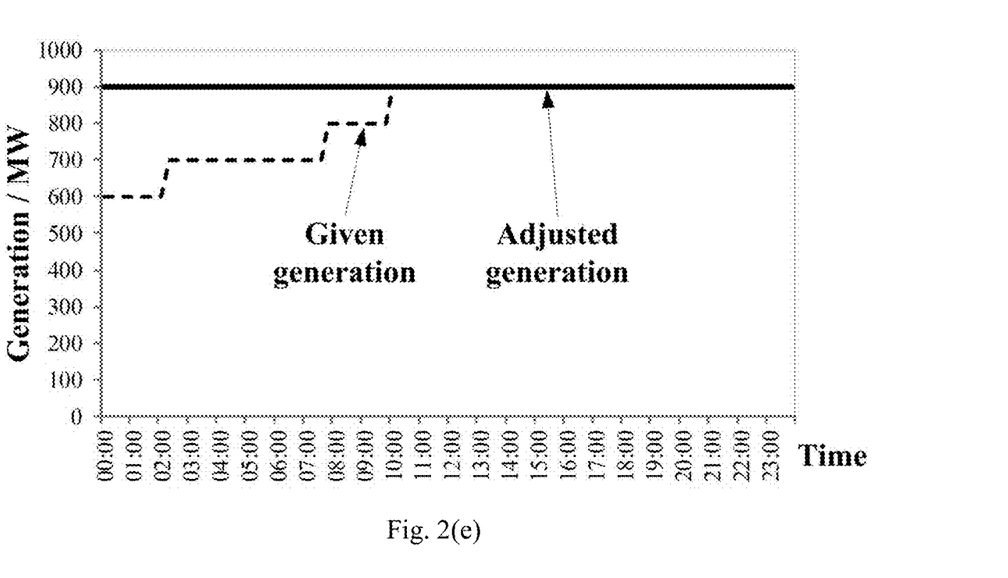
FIG. 2(e) is a schematic diagram of generation results of hydropower plant with fixed dispatching mode—Gongguoqiao.
Figure 2F:
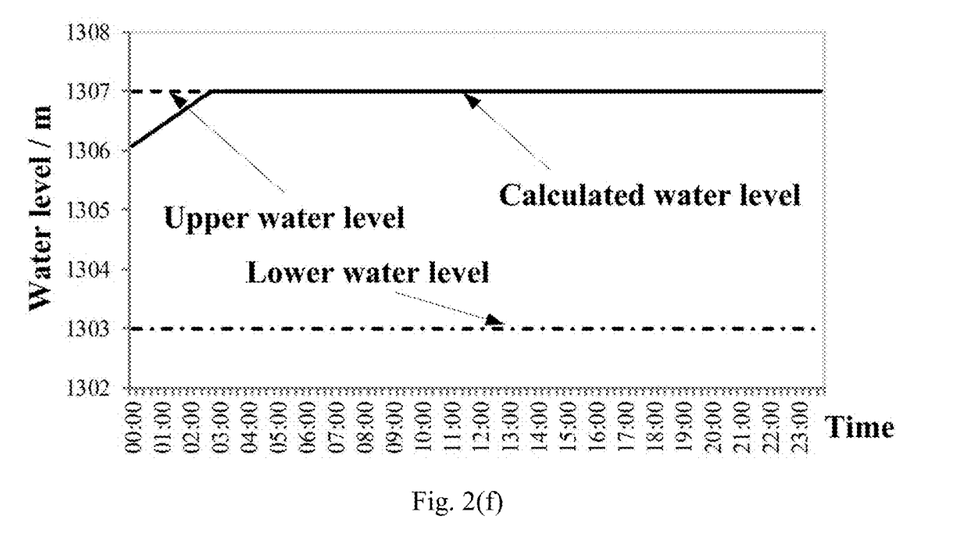
FIG. 2(f) is a schematic diagram of forebay level results of hydropower plant with fixed dispatching mode—Gongguoqiao.
Figure 2G:
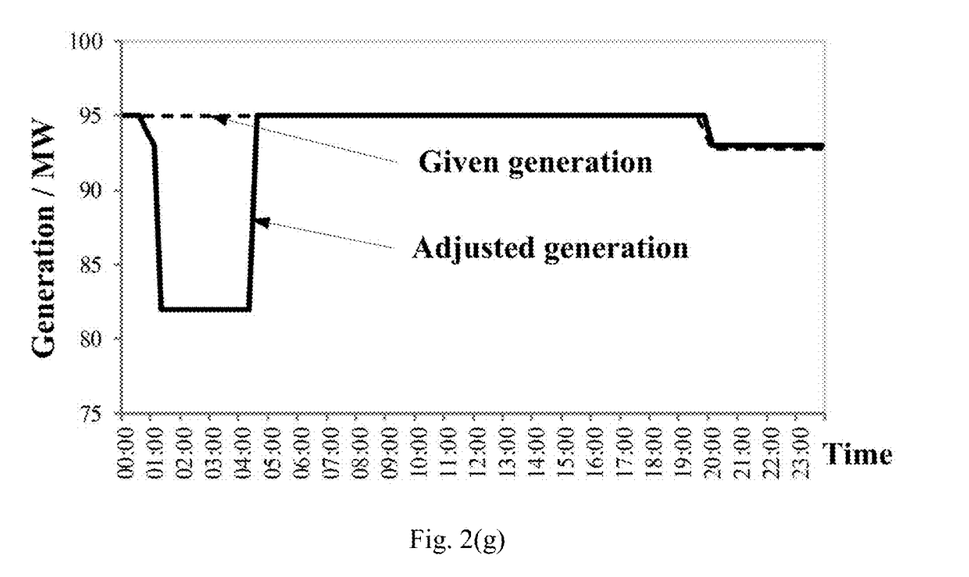
FIG. 2(g) is a schematic diagram of generation results of hydropower plant with fixed dispatching mode—Songshanhekou.
Figure 2H:
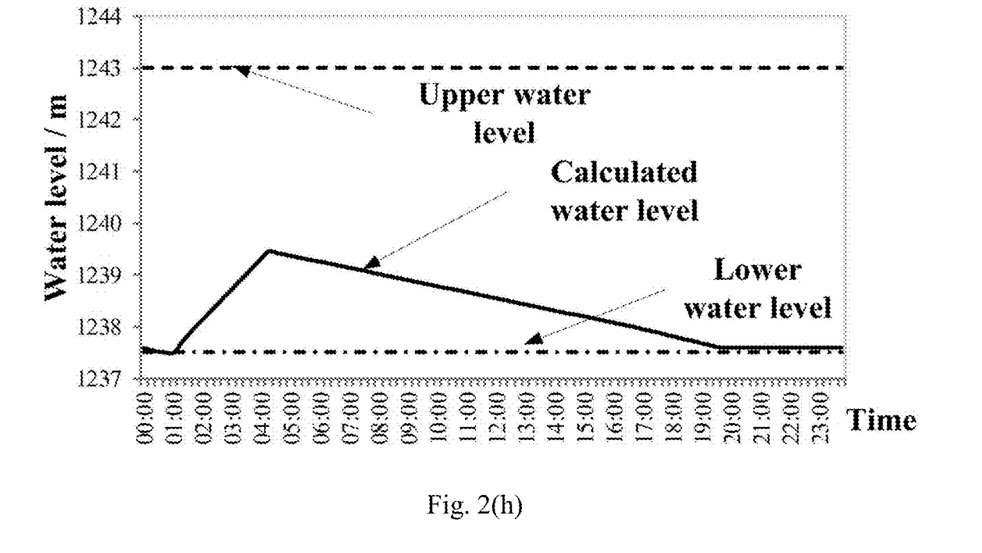
FIG. 2(h) is a schematic diagram of forebay level results of hydropower plant with fixed dispatching mode—Songshanhekou.
Figure 3:
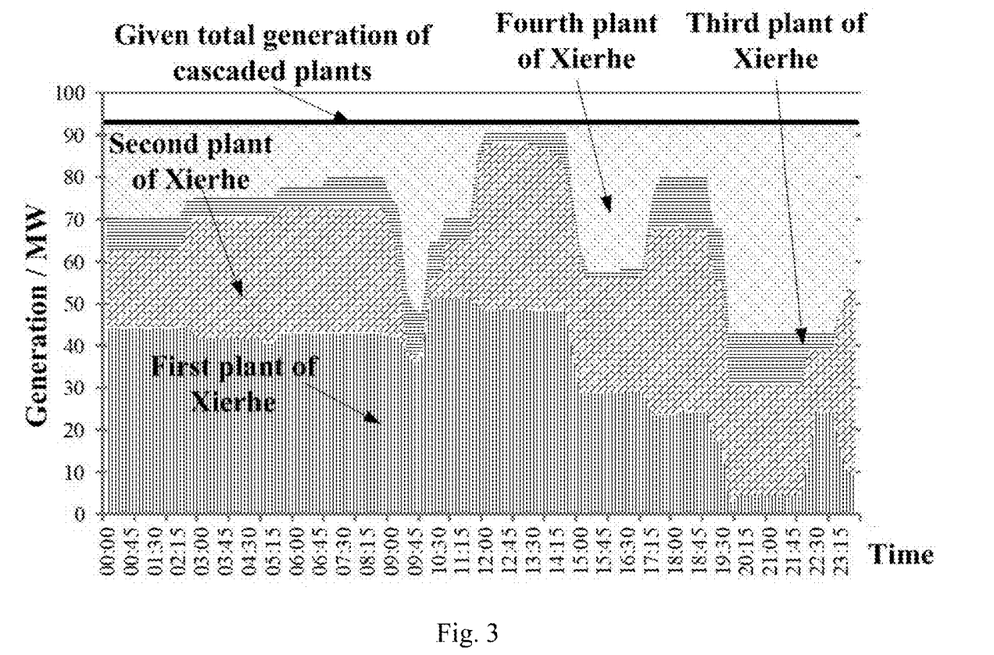
FIG. 3 is a schematic diagram of load distribution results of Xierhe cascaded hydropower plants.
Figure 4:
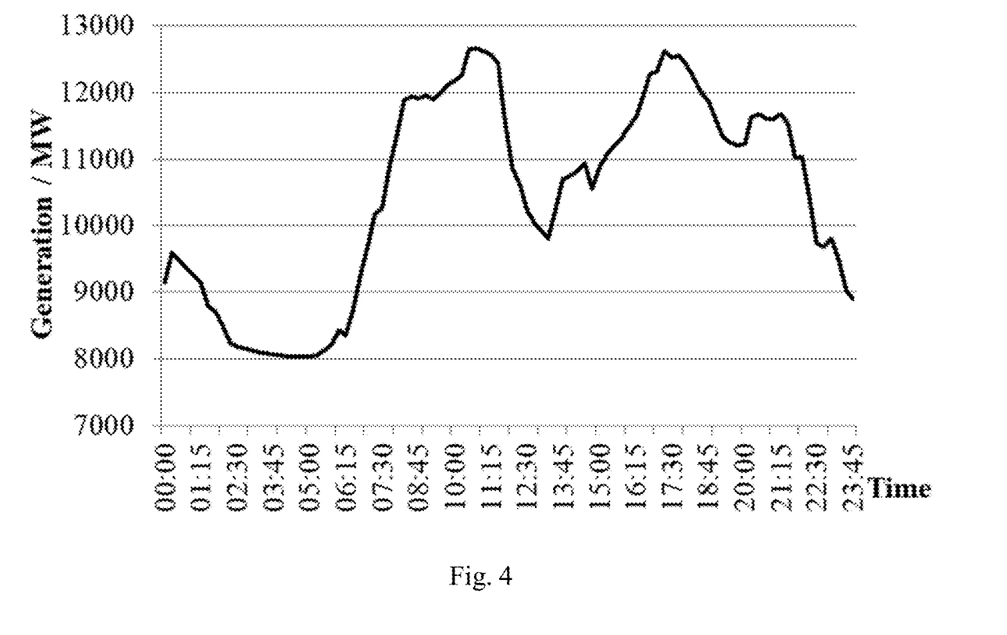
FIG. 4 is a schematic diagram of overall generation profile of optimized hydropower plants.
Figure 5:
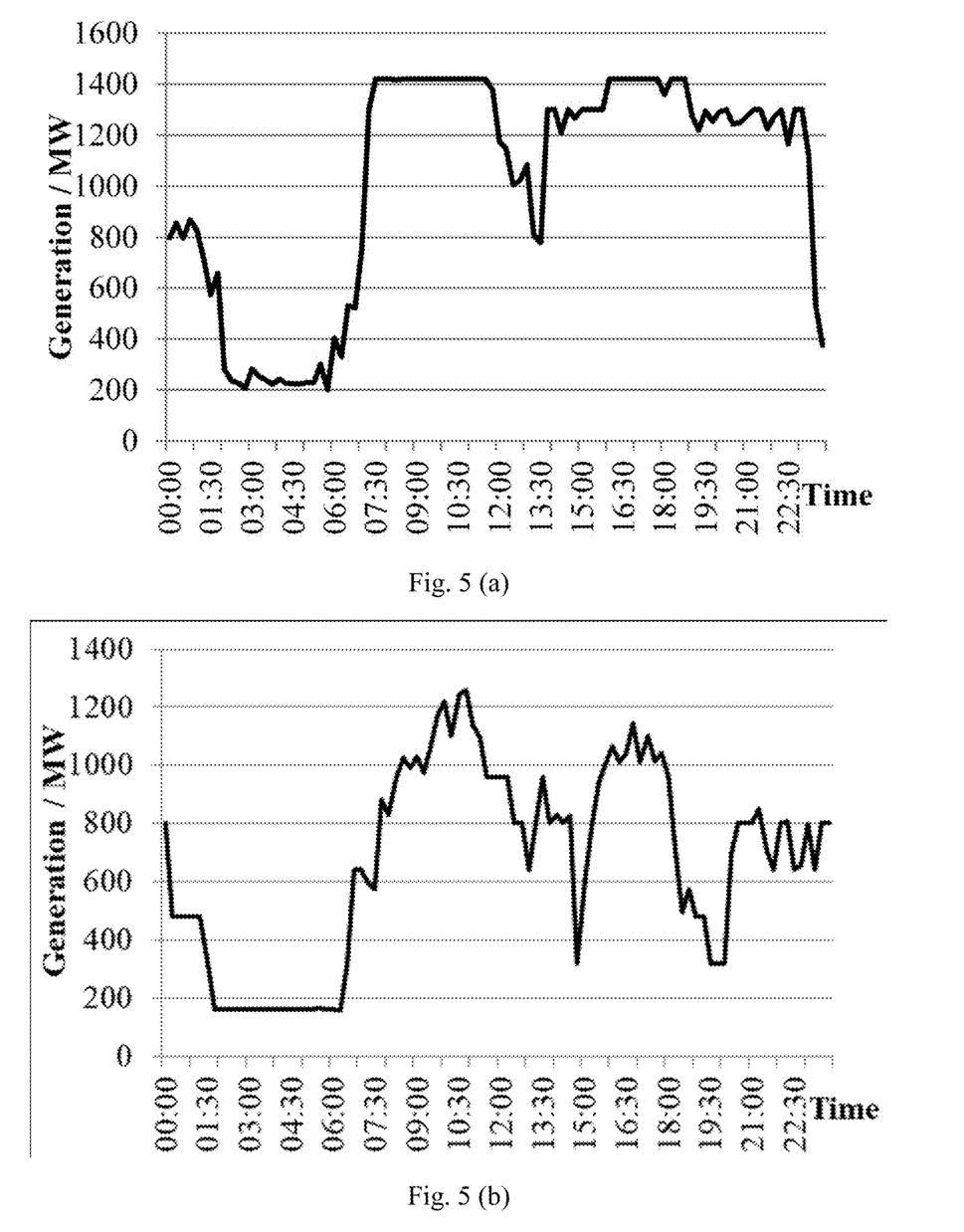
FIG. 5(a) is a schematic diagram of generation profile of balancing hydropower plant—Manwan.
FIG. 5(b) is a schematic diagram of generation profile of balancing hydropower plant—Dachaoshan.

The calculation is implemented on a computer server with IBM System X3750 M4 (CPU 2.20 GH, memory 64 G). The total computing time can be controlled within about 2 minutes without considering the time consuming of constraint input and modification, which can meet timeliness requirement of actual power operations. FIG. 1 is overall balance result of power grid. FIG. 2 is the calculation and analysis results of some hydropower plants with fixed dispatching modes. FIG. 3 is load distribution results of cascaded hydropower plants on Xier River. FIGS. 4 and 5 are total generation profile of optimized hydropower plants and generation profile of two balancing power plants.

From overall balance results of power grid, the hydropower system indeed plays a major role in power supply of Yunnan Power Grid. The daily generation production is about 556.8 billion kWh, accounting for 85.3% of the total electricity. It is also the main regulating power sources for peak-shaving and buffering wind and photovoltaic power fluctuations. The peak-shaving depth reaches 12242 MW, which is 96.4% of the maximum difference between peak and valley loads of the power grid, giving full play to the role of high-quality regulation of hydropower plants.

FIG. 2 shows analysis results of checking generation of 4 hydropower plants including Nuozhadu, Liyuan, Gongguoqiao and Songshanhekou. Among them, Nuozhadu and Liyuan hydropower plants adopt the released generations from dispatching center of Southern Power Grid, while Gongguoqiao and Songshanhekou adopt the suggested power generation plan. From hydrological analysis results, it can be seen that Nuozhadu and Liyuan strictly operate with the released generation schedules, without spillage or water shortage. The reservoir water level and power discharge meet the given upper and lower limitation requirements, which is directly related to regulation performance of hydropower plants. Nuozhadu has multi-yearly regulation capability, and the fluctuation of reservoir water level is very small within one day. Liyuan has weekly regulation capability. Its initial water level is relatively low. In the case of large inflow, the reservoir water level rises about 4 in a day, but it is within a reasonable operation range. Gongguoqiao did not generate electricity according to the suggested generations. The main reason is that large inflow caused spillage. With the spillage adjustment strategy in this invention, the power generation was increased to maximum capacity. Spillage still occurred, but the result was reasonable. The generation of Songshanhekou hydropower plant does not meet the suggested schedules. The main reason is that the reservoir has fallen to dead water level and cannot meet the given generation values. With the equal load reduction strategy in this invention, the power generations in valley periods are reduced preferentially. As seen from the figure, the generations of the power plant decrease appropriately from 01:30 to 04:30, and basically keep unchanged with the given generations at other periods. This is basically consistent with actual operation demands of the power grid.

FIG. 3 is load distribution results of cascaded hydropower plants on Xier River. Given the total generation of 93 MW in each period, the generation profile of cascaded hydropower plants is optimized by using the objective of minimizing power discharge during the time horizon. As seen from FIG. 3(a), the total generation of hydropower plants fully meets cascaded generation demands. FIG. 3(b) shows that the reservoir water levels of the hydropower plants are also running within a reasonable range. The corresponding total power discharge of cascaded hydropower plants in this scheme is 2.17 million m3. Compared with the conventional uniform power generation mode, there is a reduction of 110000 m3 in the daily power discharge. The savings are up to 5%, which illustrates that compensation among cascaded hydropower plants indeed reduces overall water consumption rate and improves efficiency of water energy utilization.

FIG. 4 shows that total generation profile of optimized hydropower plants is basically consistent with the system load demand. This shows that the compensation and regulation capability of cascaded hydropower plants in large basins have played a very good role in peak-shaving, with a peak-shaving depth of 4619 MW. Manwan and Dachaoshan, as balancing power plants, have strong load tracking capability. Their generation profiles fluctuate frequently. In actual operations, the automatic regulation of AGC function can be realized. This reflects that the frequency and amplitude of the two power plants participating in load regulation are relatively large, effectively buffering load fluctuation and meeting the requirements of power balance in various periods.

TABLE 1

Virtual hydropower plants

| Virtual hydropower | Hydropower plants contained | Installed capacity/ MW |
|---|---|---|
| Laoshizhai | Laoshizhai, Dashujiao | 26 |
| Yilihe | The first, second, third, and fourth hydropower plants of Yilihe | 337.5 |
| Dawo | Dawo (Nanpianhe cascaded hydropower plants), Banqiao hydropower (Nanpianhe cascaded hydropower plants) | 26.9 |
| Miaolin | Xiongjiagou, Miaolin | 89.5 |
| Luosiwan | Xiaozhongdian, Chongjianghe, Luosiwan Ladenghe, Sitaishan, Maocaoping, Maguohe, Wayaohe | 148.3 |
| Xinqiaohe | | 59.6 |
| Laohushan | The zero level, first, and second hydropower plants of Laohushan | 53.6 |
| Buguanhe | The third hydropower plant of Buguanhe, the third hydropower plant of Niduhe | 33.9 |
| Xiyuege | Xiyuege, Linbidang (the third hydropower plant of Danzhuhe), Dongyuegu, Litoudi (the second hydropower plant of Dongyuege) | 91.1 |
| Baoshi | Jinyuan, Fengtian, Baoshi | 37.2 |
| Supahe | Qiezishan, Xiangda, Wunihe, Ajiutian | 191 |
| Gaoqiao | Youfanggou, Gaoqiao, Boxianglin, Yuele | 228 |
| Xierhe | The first, second, third, fourth hydropower plants of Xierhe | 255 |
| Nanwahe | The first, second, and third hydropower plants of Nanwahe | 22 |

TABLE 1-continued

Virtual hydropower plants

| Virtual hydropower | Hydropower plants contained | Installed capacity/ MW |
|---|---|---|
| Yanggongjiang | Jinhe, Liuhe, Yanziyan | 80 |
| Dazhaihe | The first, second, and third hydropower plants of Dazhaihe | 54 |
| Shibahe | Shibahe, Class 2 of Shibahe | 26 |
| Baishuijiang | The first, second, and third hydropower plants of Baishuijiang, | 78 |
| Lvshuihe | The first, second, and third hydropower plants of Lvshuihe | 95.5 |
| Dachunhe | The first, and second hydropower plants of Dachunhe | 50 |

The invention claimed is:

1. A method for short-term operations of hydropower plants, comprising:
categorizing hydropower plants based on operation characteristics, the operation characteristics including hierarchy, natural space attributes, task requirements, time scale and schedule particularity, wherein hydropower plants are classified and grouped, and different modeling methods and solution strategies are selected to make it solvable and quickly obtain calculation results of meeting actual engineering requirements; hydropower plants are divided into three categories: hydropower plants with specified dispatching modes, medium- and small—sized cascaded hydropower plants and large-sized cascaded hydropower plants;
for the hydropower plants with specified dispatching modes, with no change in system load demand, inflow and control requirements during adjacent days, determining the dispatching mode of power plants, including fixed generation and fixed water level; wherein the number of power plants to be optimized is reduced; only day-ahead generation schedules need to be checked; an adjustment is made when spillage and other special requirements is not satisfied; a specific adjusting method involves two typical situations in the following;
when a reservoir water level is higher than the upper limit and spillage occurs, a strategy for adjusting spillage based on peak-shaving response is used; multiple continuous periods with the largest loads are selected from the periods before last spillage period and denoting them as $[t_1, t_2]$; Eq. (1) is adopted to increase generation schedule of power plant to avoid or reduce spillage; an iterative adjustment is carried out until generation, power discharge, and the reservoir water level reach upper boundaries in the periods;

$$p'_{i,t} = \min(p_{i,t} + p_d, \overline{p}_{i,t}) \qquad (1)$$

$$p_d = \min\left\{\frac{El_i}{(t_2 - t_1 + 1)\Delta t}, \min_{t=t_1}^{t_2}(p_{i,t} + pr_i)\right\} \qquad (2)$$

where $p_d$ is step of generation adjustment; $P^r_i$, s allowable maximum change of generation increase or decrease of power plant i at adjacent periods; $p_{i,t}'$ is generation of power plant i at period t; $P_{i,t}$, $\overline{P}_{i,t}$ are average generation and upper limit of power plant i at period t, respectively; $El_i$s spilled electricity; $\Delta t$ is hours during period t; t and T are period index and total number, respectively; $[t_1, t_2]$ is a set of $T_i^{min}$ continuous periods with the largest load value; $T_i^{min}$ is minimum duration of generation extremum;

when water level is below lower limit and the reservoir is unable to meet specified dispatching mode or generation, equal load reduction in off-peak hours is used; $T_i^{min}$ continuous periods with minimum load value are selected and denoted as $[t_3, t_4]$; Eq. (3) is adopted to reduce generation of power plant to ensure feasibility of power generation; an iterative adjustment is carried out until power generations in all period reached specified lower bound;

$$p_{i,t}' = \max\{p_{i,t} - p_d^0, \underline{p}_{i,t}\}, t_3 \leq t \leq t_4 \quad (3)$$

where $\underline{p}_{i,t}$ is lower limit of generation of power station i at period t; $p_d^0$ is given step of generation adjustment; $[t_3, t_4]$ is a set of $T_i^{min}$ continuous periods with the largest load value;

for the medium—and small—sized cascaded hydropower plants, optimizing load distribution among plants with an objective of minimizing total power release subject to the control condition of total generation profile; a load distribution problem is solved by a mutative-scale method; during solution process of the load distribution problem, an external penalty function method is used to deal with a load balance constraint in Eq.(4), where an objective penalty item is introduced; which is represented as Eqs.(5) and (6);

$$\sum_{i=1}^{N} p_{i,t} = p_t \quad (4)$$

$$F_{pen} = \sum_{t=1}^{T} r_t \times \left| \sum_{i=1}^{N} p_{i,t} - p_t \right| \quad (5)$$

$$r_t = \begin{cases} 0, & \left| \sum_{i=1}^{N} p_{i,t} - p_t \right| \leq \varepsilon \\ a \times \left| \sum_{i=1}^{N} p_{i,t} - p_t \right|^2, & \left| \sum_{i=1}^{N} p_{i,t} - p_t \right| > \varepsilon \end{cases} \quad (6)$$

where $p_t$ is total generation for a given period t; N is total number of hydropower plants; $F_{pen}$ is an objective penalty function; $r_t$ is a penalty coefficient; $\varepsilon$ is an allowable maximum error of load balance; a is a penalty constant;

for the large-sized cascaded hydropower plants, combining an optimization model for peak-shaving operations and a method for balancing power plants with equal load rate to respond to system peak demands and guarantee power balance in all periods;

optimizing generation of non-balancing power plants; wherein Eq.(7) is used to construct an optimization model of peak-shaving operations; a mutative-scale method is used to solve the model;

$$\begin{cases} \min F_1 = \sum_t (R_t - \bar{R})^2 \\ R_t = L_t - \sum_{i=1}^{N} p_{i,t} \\ \bar{R} = \frac{1}{T} \sum_{t=1}^{T} R_t \end{cases} \quad (7)$$

where $\min F_1$, is minimum distributed load of power plant; $R_t$ is residual load of power grid at period t after a hydropower plant regulates peak loads; $\bar{R}$ is an average residual load of power grid; $L_t$ is load demand of power grid in period t;

optimizing generation of balanced power plants; wherein remaining electricity $E_{i_c}$ of each power plant is divided into Y parts equally and express it as $\{\tilde{E}_{i_c}^1, \tilde{E}_{i_c}^2, \ldots, \tilde{E}_{i_c}^Y\}$ $\tilde{E}_{i_c} = \tilde{E}_{i_c}^1 + \tilde{E}_{i_c}^2 + \ldots + \tilde{E}_{i_c}^Y$; set initial electricity of each power plant as $\tilde{E}_{i_c}^1$, c=1, 2, ..., C, C is total number of balanced power plants, c is balanced power plant index; according to order from upstream to downstream, a successive load shedding method is used to determine generation profile of power plants; distributed electricity of each power plant is updated with electricity block, and corresponding generation profile is determined; updating of distributed electricity of power plants is stopped until all electricity blocks of each power plant is completed; a final generation of each power plant is obtained by accumulating generations of all electricity blocks.

2. The method for short-term operations of the large sized hydropower plants according to claim 1, wherein, the steps for operations of the large-sized cascaded hydropower plants include:

first, considering unbalanced electricity and available capacity of balancing power plants, Eq.(8) is used to estimate energy production of each power plant;

$$E_{i_c} = \frac{p_{i_c,max}}{\sum_{c=1}^{C} p_{i_c,max}} \times \sum_{t=1}^{T} R_t \times \Delta t \quad (8)$$

where c is index of balancing power plants; C is total number of balancing power plants;

$p_{i_c,max}$ is maximum available capacity of power plant $i_c$;

second, deducting minimum technical generation of balancing power plants from current loads to meet generation requirements of startup units of each power plant; Eq.(9) is used to calculate remaining electricity of each power plant;

$$\tilde{E}_{i_c} = E_{i_c} \times \sum_{t=1}^{T} p_{i_c,t}^{min} \times \Delta t \quad (9)$$

where $p_{i_c,t}^{min}$ is minimum technical generation of power plant $i_c$ at period t;

after updating with the next blocked electricity, Eq.(10) is used to determine a remaining available capacity according to minimum technical generation of each power plant and accumulated generations; it is taken as an upper generation limit;

$$p_{i_c,t}^{max} = p_{i_c,max} - p_{i_c,t}^{min} - \sum_{y=1}^{Y'} p_{i_c,t}^y \quad (10)$$

where $p_{i_c,t}^{max}$ is remaining maximum available capacity of power plant $i_c$ at period t; Y' is number of electricity blocks that has been calculated; $p_{i_c,t}^y$ is generation of yth electricity block of power plant $i_c$ at period t;

after all electricity blocks are calculated, calculation process will stop if power balance in all periods is reached; otherwise, electricity deviation is obtained; Eq.(10) is used to determine number of electricity blocks that need to be recalculated; meanwhile, all power plants are sorted in ascending order of generation load rate; a load shedding method is used to determine generation profile of the ordered power plants one by one; aforementioned steps are repeated until power balance is attained; when Eq.(11) is satisfied at any a period, the power balance is attained;

$$\sum_{i=1}^{N} P_{i,t} = P_t \quad (11)$$

where $p_t$ is the specified load demand.

\* \* \* \* \*